(12) United States Patent
Chang

(10) Patent No.: US 9,069,409 B2
(45) Date of Patent: Jun. 30, 2015

(54) COORDINATE ALGORITHM OF TOUCH PANEL

(75) Inventor: Hui-Hung Chang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1171 days.

(21) Appl. No.: 12/964,744

(22) Filed: Dec. 10, 2010

(65) Prior Publication Data

US 2012/0098759 A1 Apr. 26, 2012

(30) Foreign Application Priority Data

Oct. 26, 2010 (TW) ................................ 99136508 A

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ............................... G06F 3/044; G06F 3/0418
USPC ................................................. 345/173–178
See application file for complete search history.

(56) References Cited

U.S. PATENT DOCUMENTS

| 2003/0169239 | A1 | 9/2003 | Nakano et al. | |
|---|---|---|---|---|
| 2007/0074914 | A1* | 4/2007 | Geaghan et al. | ............ 178/18.06 |
| 2011/0050635 | A1* | 3/2011 | Nien et al. | ..................... 345/174 |

FOREIGN PATENT DOCUMENTS

| CN | 101387927 | 3/2009 |
|---|---|---|
| CN | 101470561 | 7/2009 |
| TW | 200529052 | 9/2005 |
| TW | 200928933 | 7/2009 |

OTHER PUBLICATIONS

"Office Action of Taiwan Counterpart Application", issued on Oct. 25, 2013, p. 1-5, in which the listed references were cited.
"First Office Action of China counterpart application" issued on Jan. 8, 2014, p. 1-6, in which the listed references were cited.

* cited by examiner

*Primary Examiner* — Dennis Joseph
(74) *Attorney, Agent, or Firm* — Jianq Chyun IP Office

(57) ABSTRACT

A coordinate algorithm of a touch panel is provided, in which the touch panel includes a plurality of first-direction sensing lines and a plurality of second-direction sensing lines. The coordinate algorithm of a touch panel includes following steps. A first edge coordinate is obtained. A first coordinate compensation parameter is defined. The first edge coordinate is taken as a first base coordinate, and the first base coordinate is adjusted according to the first coordinate compensation parameter to obtain a first interpolation coordinate when an edge of the touch panel is touched.

6 Claims, 9 Drawing Sheets

COORDINATE ALGORITHM OF TOUCH PANEL

CROSS-REFERENCE TO RELATED APPLICATION

This application claims the priority benefit of Taiwan application serial no. 99136508, filed on Oct. 26, 2010. The entirety of the above-mentioned patent application is hereby incorporated by reference herein and made a part of this specification.

BACKGROUND OF THE INVENTION

1. Field of the Invention

The invention generally relates to a coordinate algorithm, in particular, to a coordinate algorithm of a touch panel.

2. Description of Related Art

As demands on multi-touch technology are increased, the projected capacitive touch technology has become one of mainstream touch panel technologies. As the human body is an excellent conductor, if the human body approaches a projected capacitive touch panel, the capacitance generated by combination of electrostatic charges between a transparent electrode (indium tin oxide, ITO) of the projected capacitive touch panel and the human body is increased. The position of a touched point may be known by detecting changes of electrostatic capacity of sensing lines on the projected capacitive touch panel.

However, for the projected capacitive touch panel, in order to sense a sufficient capacitance of the human body, the area of sensing pads needs to be considered, such that the sensing lines on the projected capacitive touch panel are limited, and the resolution of the projected capacitive touch panel is also limited. For example, in consideration of physical characteristics of the projected capacitive touch panel, the area of rhomboidal sensing pads on the sensing line is approximately 5 mm×5 mm, so as to maintain an appropriate sensing area.

Therefore, a common 3-inch projected capacitive touch panel approximately has 12x-direction sensing lines and 8 y-direction sensing lines. In this manner, when the 3-inch projected capacitive touch panel has the sensing lines of a 12×8 matrix, the projected capacitive touch panel can only have a coordinate resolution of 12×8. It is difficult to apply the projected capacitive touch panel with such a low resolution to current information products mostly requiring a high resolution.

Therefore, in order to increase the resolution of the projected capacitive touch panel, a coordinate algorithm of a touch panel is proposed in relevant technologies. However, when sensing a touch object at an edge thereof, the touch panel using the coordinate algorithm still has some defects, for example, a problem of linearity and accuracy offsets of a frame of the touch panel.

SUMMARY OF THE INVENTION

Accordingly, the invention is directed to a coordinate algorithm of a touch panel, which can overcome the problem of linearity and accuracy offsets of a frame of the touch panel.

The invention provides a coordinate algorithm of a touch panel, in which the touch panel includes a plurality of first-direction sensing lines and a plurality of second-direction sensing lines. The coordinate algorithm includes the following steps. A first edge coordinate is obtained. A first coordinate compensation parameter is defined. The first edge coordinate is taken as a first base coordinate, and the first base coordinate is adjusted according to the first coordinate compensation parameter to obtain a first interpolation coordinate when a first edge of the touch panel is touched.

In an embodiment of the invention, M stages of first-direction coordinates are differentiated between two of the neighboring first-direction sensing lines, and M is a positive integer.

In an embodiment of the invention, the step of defining the first coordinate compensation parameter includes: the first coordinate compensation parameter is defined according to the M value.

In an embodiment of the invention, the step of defining the first coordinate compensation parameter includes: the first coordinate compensation parameter is defined according to the number of the first-direction sensing lines.

In an embodiment of the invention, the touch panel further includes a dummy line. The coordinate algorithm further includes: the first interpolation coordinate is scaled according to an area difference between the touched first-direction sensing line and the dummy line.

In an embodiment of the invention, the coordinate algorithm further includes the following steps. A second edge coordinate is obtained. A second coordinate compensation parameter is defined. The second edge coordinate is taken as a second base coordinate, and the second base coordinate is adjusted according to the second coordinate compensation parameter to obtain a second interpolation coordinate when the first edge or a second edge of the touch panel is touched.

In an embodiment of the invention, N stages of second-direction coordinates are differentiated between two of the neighboring second-direction sensing lines, and N is a positive integer.

In an embodiment of the invention, the step of defining the second coordinate compensation parameter includes: the second coordinate compensation parameter is defined according to the N value.

In an embodiment of the invention, the step of defining the second coordinate compensation parameter includes: the second coordinate compensation parameter is defined according to the number of the second-direction sensing lines.

In an embodiment of the invention, the touch panel further includes a dummy line. The coordinate algorithm further includes: the second interpolation coordinate is scaled according to an area difference between the touched second-direction sensing line and the dummy line.

In an embodiment of the invention, an arrangement direction of the first-direction sensing lines is substantially perpendicular to an arrangement direction of the second-direction sensing lines.

Based on the above, the coordinate algorithm according to the exemplary embodiments of the invention overcomes the problem of linearity and accuracy offsets of the frame of the touch panel by defining the appropriate coordinate compensation parameters.

In order to make the aforementioned features and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
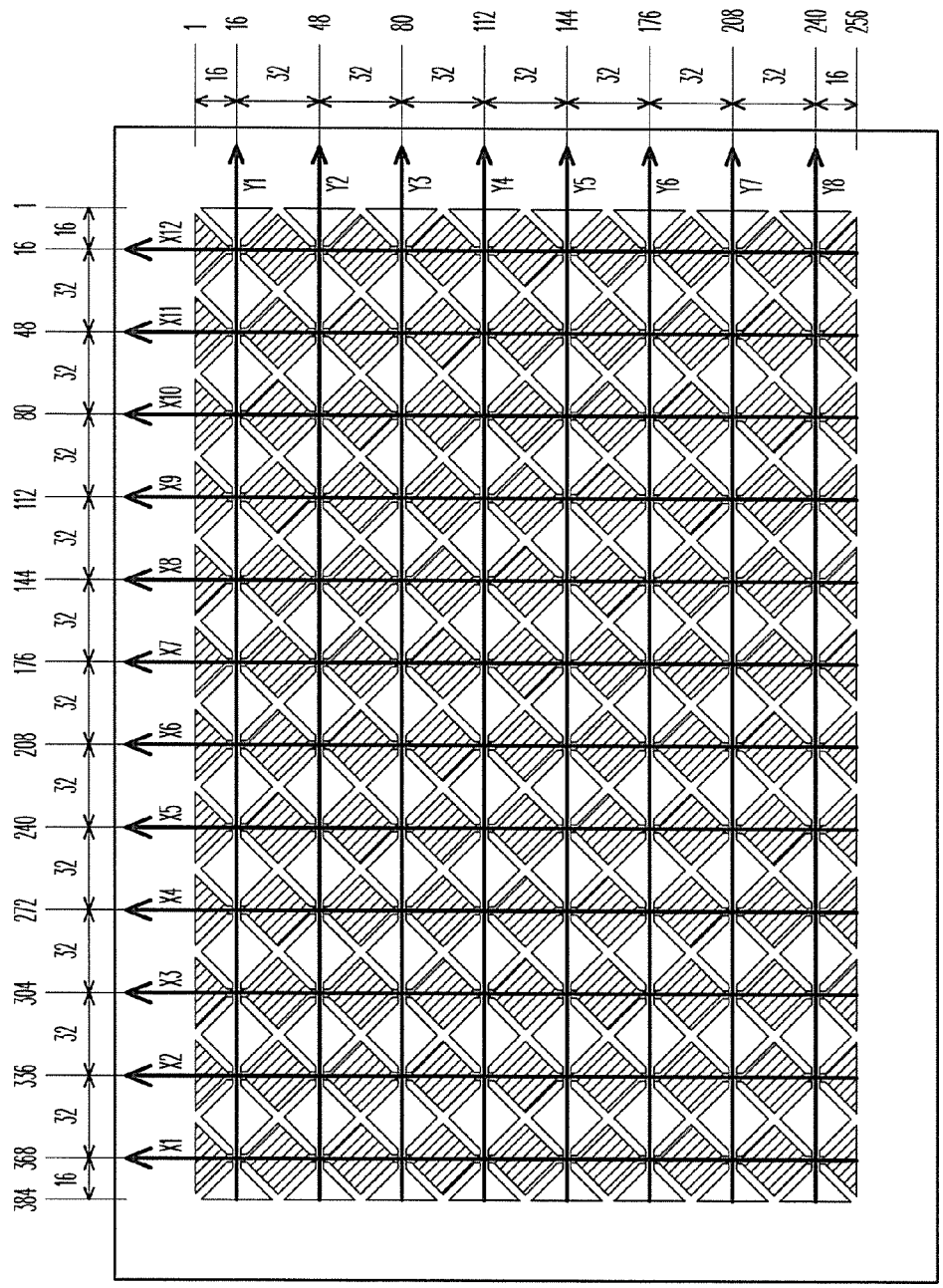
FIG. 1A is a schematic view of a capacitive touch panel.

Reference will now be made in detail to the present embodiments of the invention, examples of which are illustrated in the accompanying drawings. Wherever possible, the same reference numbers are used in the drawings and the description to refer to the same or like parts.

A software algorithm and hardware modification according to exemplary embodiments of the invention can alleviate the problems of zigzag lines and linearity and accuracy offsets at edges of a touch panel, and is not limited to a specific sensing manner of capacitive touch panels, but is also applicable to other sensing manners of capacitive touch panels, for example, self-induction, mutual-induction, and button ITO.

FIG. 1A is a schematic view of a capacitive touch panel. In a relevant coordinate algorithm, x-direction sensing lines X1-X12 and y-direction sensing lines Y1-Y8 of a touch panel 100 are distributed to coordinate resolution ranges with the same pitch, as shown in FIG. 1A.

Figure 1B:
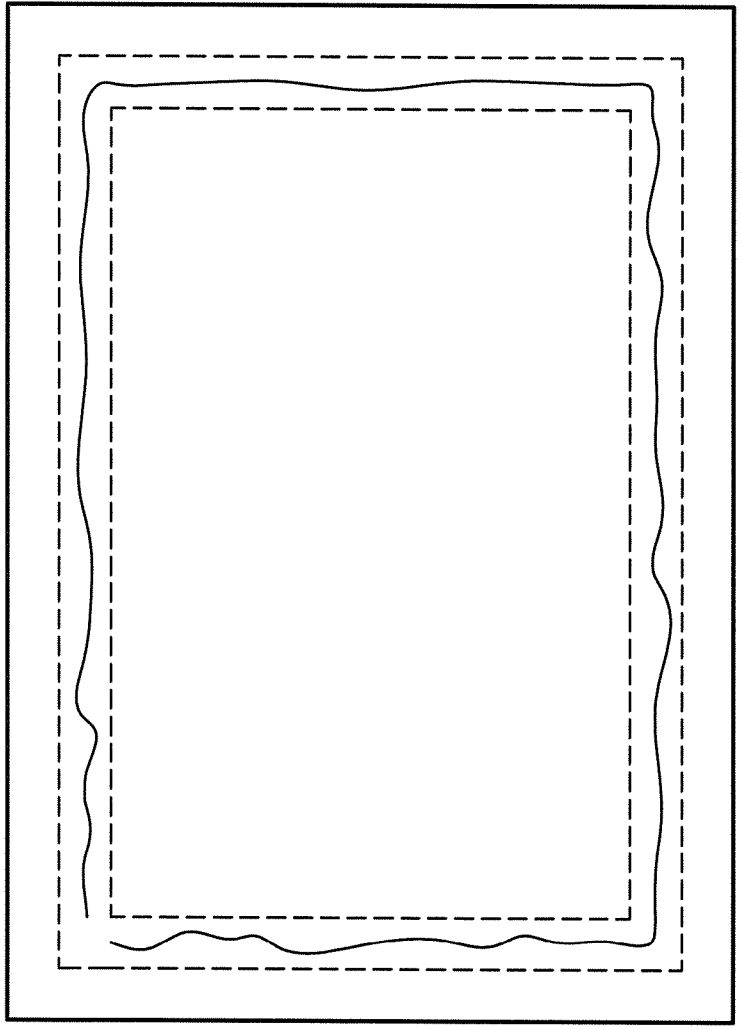
FIG. 1B shows a problem of zigzag lines at edges of a touch panel.

An x-direction is taken as an example, x coordinate values on the touch panel 100 are differentiated by the neighboring x-direction sensing lines according to the amount of capacitance sensing and a ratio thereof. However, when a human body operates at an edge of the touch panel 100, the x-direction sensing line X1 on a left edge or the x-direction sensing line X12 on a right side edge has no symmetric neighboring x-direction sensing line for performing differentiation to obtain appropriate x coordinate values. Therefore, in the coordinate algorithm, a sensed value pre-estimated during an experiment procedure is used to perform a differentiation operation with the x-direction sensing line X1 or X12, resulting in the problem of zigzag lines at edges of the touch panel 100. In a y-direction, when the operation is performed according to the coordinate algorithm, the same problem also exists. FIG. 1B shows the problem of zigzag lines at the edges of the touch panel 100.

Figure 1C:
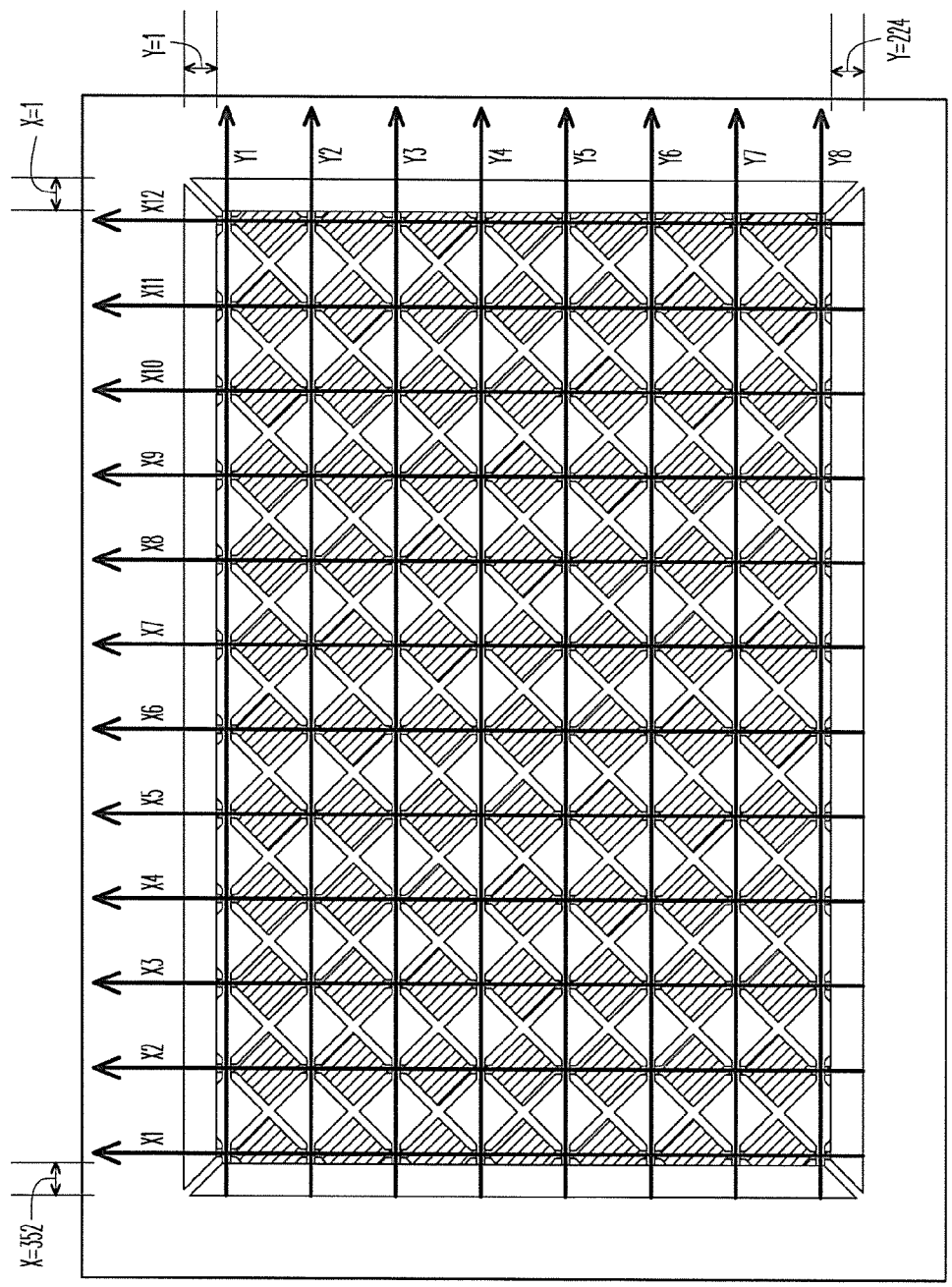
FIG. 1C shows that sensed values of sensing lines at upper, lower, left, and right edges in a touch panel maintain outputs of constant values.
Figure 1D:
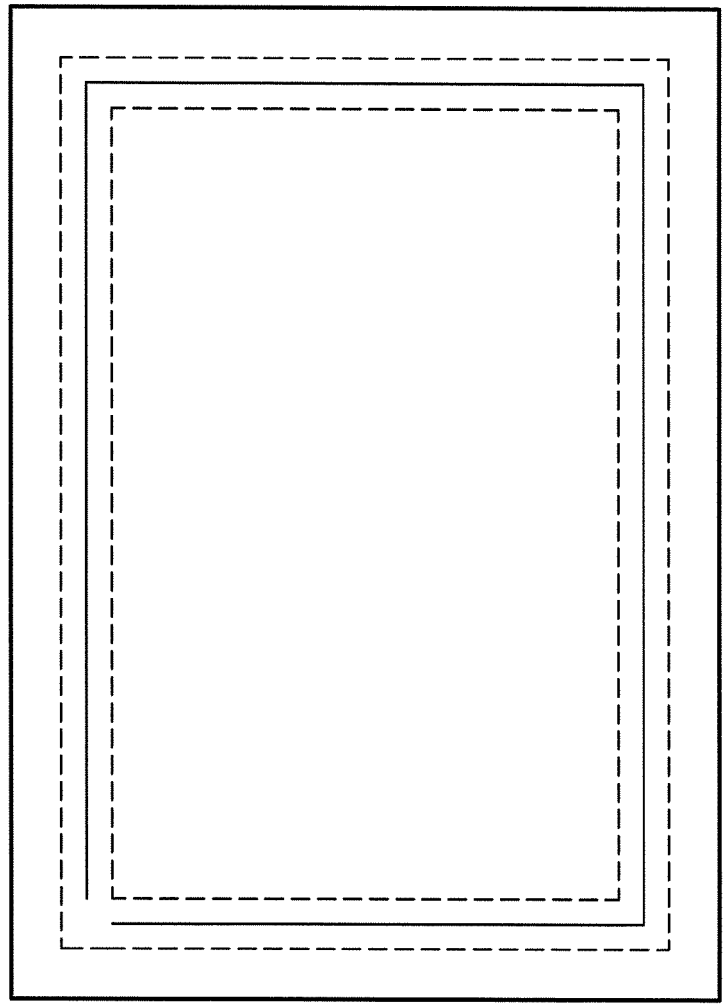
FIG. 1D shows that edges of a touch panel can attain a linear output.

Under a condition of maintaining the sensing lines of the touch panel 100, the coordinate algorithm is modified, such that sensed values of sensing lines at upper, lower, left, and right edges in the touch panel 100 maintain outputs of constant values, as shown in FIG. 1C. In FIG. 1C, X=1 represents that when the right edge of the touch panel 100 is touched, the sensed value of a region on the right of the x-direction sensing line X12 maintains an output of a constant value X=1, and X=352 represents that when the left edge of the touch panel 100 is touched, the sensed value of a region on the left of the x-direction sensing line X1 maintains an output of a constant value X=352, and for the y-direction, the situation is deduced by analogy. In the modified coordinate algorithm, the sensed value pre-estimated during the experiment procedure is no longer used to perform the differentiation operation with the sensing line X1, X12, Y1, or Y8, and the edges can attain a linear output, as shown in FIG. 1D.

However, although the modified coordinate algorithm solves the problem of zigzag lines at the edges of the touch panel 100, a problem of linearity and accuracy offsets is caused.

Accordingly, in the coordinate algorithm according to exemplary embodiments of the invention, appropriate coordinate compensation parameters are defined, so as to overcome the problem of zigzag lines at the edges of the touch panel and further overcome the problem of linearity and accuracy offsets of the frame of the touch panel.

Figure 2:
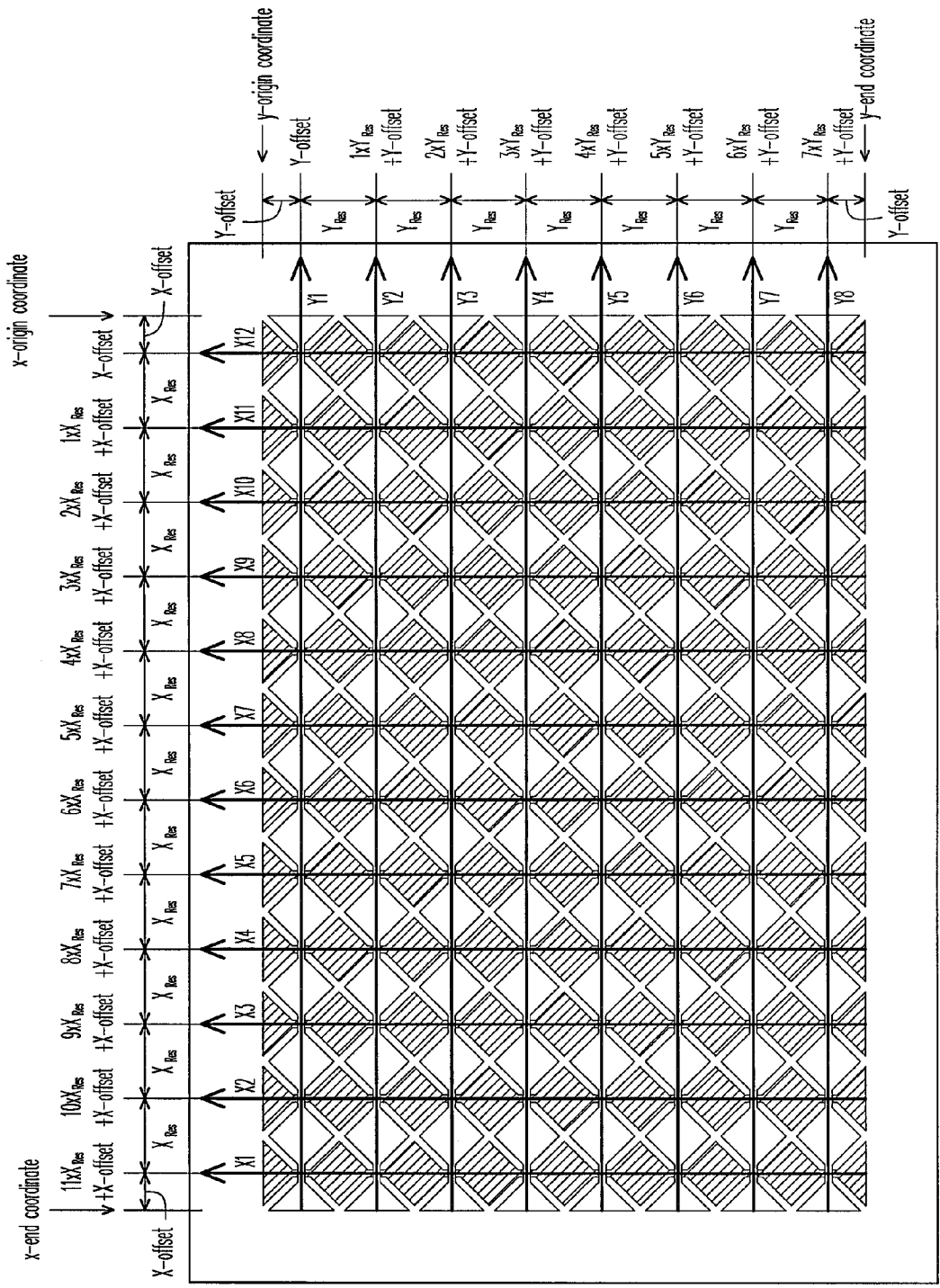
FIG. 2 is a schematic view of a touch panel according to an embodiment of the invention.

FIG. 2 is a schematic view of a touch panel according to an embodiment of the invention. Referring to FIG. 2, in this embodiment, each sensing line on the touch panel 200 has a plurality of rhomboidal sensing pads. Here, for description, the touch panel 200 is, for example, a 3-inch panel, has 12 x-direction sensing lines X1-X12 and 8 y-direction sensing lines Y1-Y8, and has a preset resolution of 384×256, but the invention is not limited thereto.

In an application where it is not required to additionally increase sensing regions of the touch panel 200, for edges of the touch panel 200, in the coordinate algorithm according to this embodiment, appropriate coordinate compensation parameters X-offset and Y-offset are defined. Further, a central coordinate of each sensing line may be obtained according to an interpolation range of each sensing line, as shown in FIG. 2. $X_{Res}$ and $Y_{Res}$ are respectively the interpolation ranges of the x-direction sensing lines and the y-direction sensing lines, and X-offset and Y-offset are respectively the coordinate compensation parameters of an x-direction and a y-direction.

Specifically, in the coordinate algorithm according to this embodiment, the central coordinate of the x-direction sensing line X12 is X-offset, the central coordinate of the x-direction sensing line X11 is $1 \times X_{Res}$+X-offset, . . . , and the central coordinate of the x-direction sensing line X1 is $11 \times X_{Res}$ X-offset, and so forth.

In this embodiment, the preset resolution is 384×256, such that if an x-origin coordinate and a y-origin coordinate of the touch panel 200 are 1, it can be obtained according to the preset resolution of 384×256 that an x-end coordinate and a y-end coordinate are, for example, 384 and 256 respectively. In addition, in this embodiment, 32 stages (M stages) of x coordinates are differentiated between two neighboring x-direction sensing lines, and 32 stages (N stages) of y coordinates are differentiated between two neighboring y-direction sensing lines, that is, the interpolation ranges $X_{Res}$ and $Y_{Res}$ of the x-direction sensing lines and the y-direction sensing lines are respectively 32.

Figure 3:
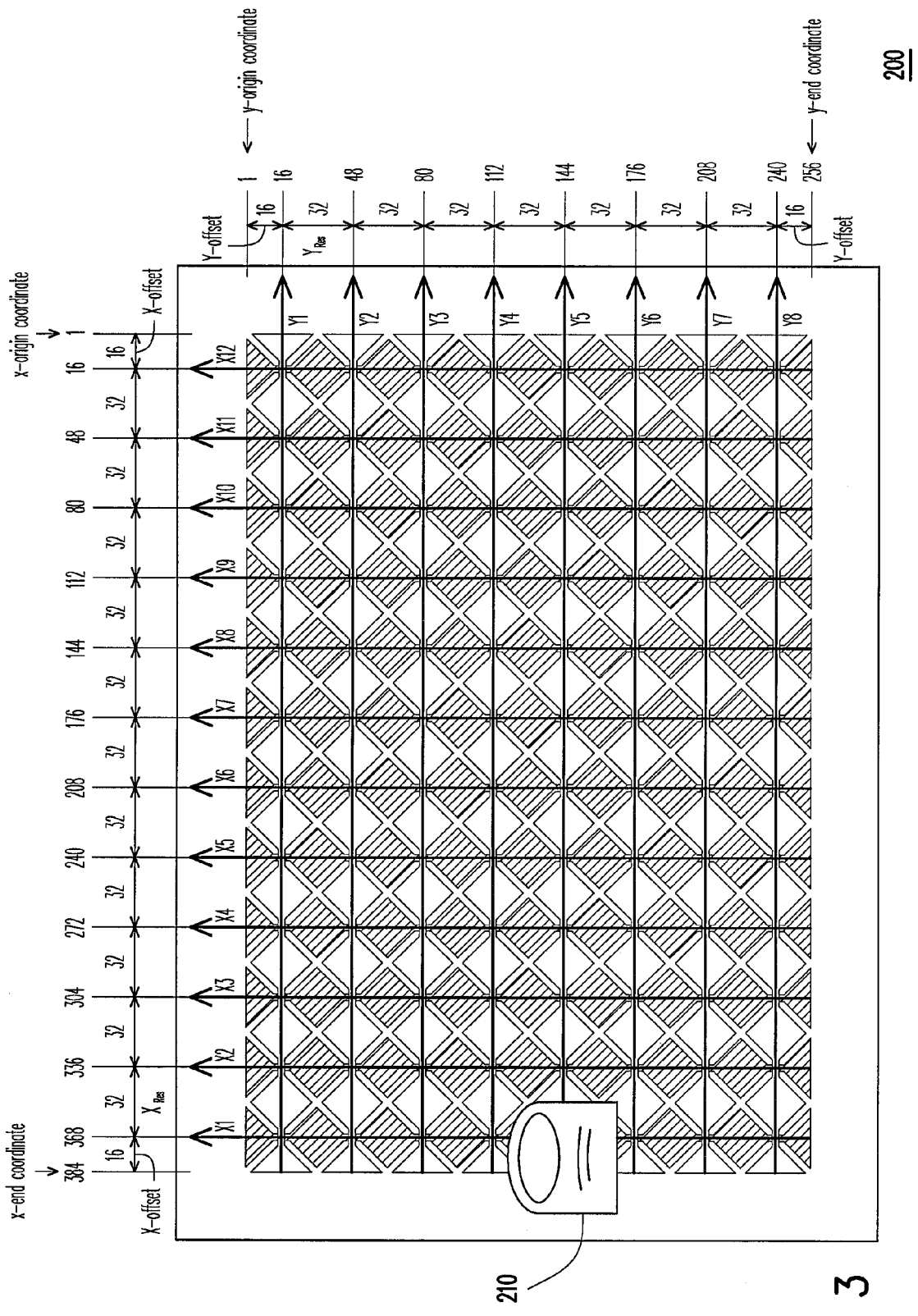
FIG. 3 shows coordinate values of sensing lines and edge coordinates of a touch panel according to parameters defined in a coordinate algorithm according to the embodiment of FIG. 2.

Further, according to the parameters defined in the coordinate algorithm according to this embodiment, coordinate values of the sensing lines and edge coordinates (including an origin coordinate and an end coordinate of each direction) of the touch panel 200 are as shown in FIG. 3. Here, X-offset and Y-offset are, for example, defined as $X_{Res}/2$ and $Y_{Res}/2$ respectively. In other words, in the coordinate algorithm according to this embodiment, the coordinate compensation parameters X-offset and Y-offset are respectively defined according to the interpolation ranges $X_{Res}$ (that is, the M value) and $Y_{Res}$ (that is, the N value).

Referring to FIG. 3, when a human body 210 approaches a left edge of the touch panel 200, only the x-direction sensing line X1 generates an inductive capacitance value exceeding a critical value in the x-direction. Under the situation, in the coordinate algorithm according to this embodiment, the x-end coordinate being 384 is taken as an x-base coordinate, and then the x-base coordinate is adjusted according to the coordinate compensation parameter X-offset to obtain an x interpolation coordinate Xd; please refer to Formula (1):

$$Xd = x\text{-base coordinate} - X\text{-offset} \qquad \text{Formula (1)}$$

Here, the x-base coordinate is the x-end coordinate being 384, and the coordinate compensation parameter X-offset is $X_{Res}/2=16$.

Similarly, the situation is applicable to the case when the human body 210 approaches a right edge of the touch panel 200 (not shown). At this time, only the x-direction sensing line X12 generates an inductive capacitance value exceeding a critical value in the x-direction. Under the situation, in the coordinate algorithm according to this embodiment, the x-origin coordinate being 1 is taken as an x-base coordinate, and then the x-base coordinate is adjusted according to the coordinate compensation parameter X-offset to obtain an x interpolation coordinate Xd; please refer to Formula (2):

$$Xd = x\text{-base coordinate} + X\text{-offset} \qquad \text{Formula (2)}$$

Here, the x-base coordinate is the x-origin coordinate being 1, and the coordinate compensation parameter X-offset is $X_{Res}/2=16$.

Similarly, on the y-direction sensing line, when the human body 210 approaches a lower edge of the touch panel 200, only the y-direction sensing line Y8 generates an inductive capacitance value exceeding a critical value in the y-direction. Under the situation, in the coordinate algorithm according to this embodiment, the y-end coordinate being 256 is taken as a y-base coordinate, and then the y-base coordinate is adjusted according to the coordinate compensation parameter Y-offset to obtain a y interpolation coordinate $ys_d$; please refer to Formula (3):

$$Yd = y\text{-base coordinate} - Y\text{-offset} \qquad \text{Formula (3)}$$

Here, the y-base coordinate is the y-end coordinate being 256, and the coordinate compensation parameter Y-offset is $Y_{Res}/2=16$.

Similarly, the situation is applicable to the case when the human body 210 approaches an upper edge of the touch panel 200 (not shown). At this time, only the y-direction sensing line Y1 generates an inductive capacitance value exceeding a critical value in the y-direction. Under the situation, in the coordinate algorithm according to this embodiment, the y-origin coordinate being 1 is taken as a y-base coordinate, and then the y-base coordinate is adjusted according to the coordinate compensation parameter Y-offset to obtain a y interpolation coordinate Yd; please refer to Formula (4):

$$Yd = y\text{-base coordinate} + Y\text{-offset} \qquad \text{Formula (4)}$$

Here, the y-base coordinate is the y-origin coordinate being 1, and the coordinate compensation parameter Y-offset is $Y_{Res}/2=16$.

It should be noted that when the human body 210 approaches an upper left edge of the touch panel 200 (not shown), only the x-direction sensing line X1 generates an inductive capacitance value exceeding a critical value in the x-direction, and only the y-direction sensing line Y1 generates an inductive capacitance value exceeding a critical value in the y-direction. At this time, in the coordinate algorithm according to this embodiment, the x-base coordinate and the y-base coordinate are respectively adjusted according to Formula (1) and Formula (4) to obtain the x interpolation coordinate Xd and the y interpolation coordinate Yd.

When the human body 210 approaches a lower left edge, an upper right edge, or a lower right edge of the touch 200 (not shown), the corresponding interpolation coordinates may be obtained by analogy according to the calculation manner when the human body 210 approaches the upper left edge of the touch panel 200.

It should be noted that in this embodiment, the number of the sensing lines of each direction, the coordinate compensation parameters X-offset and Y-offset, the interpolation range $X_{Res}$ and $Y_{Res}$, the preset resolution, and the formulas are merely for exemplary description, and the invention is not limited thereto.

In addition, in this embodiment, the expression that the "edge" of the touch panel is touched means that the sensing line generating the inductive capacitance value exceeding the critical value in the specific direction has no symmetric neighboring sensing line of the same direction for performing differentiation operation.

Therefore, the coordinate algorithm according to this embodiment, by defining the appropriate coordinate compensation parameters, can not only overcome the problem of zigzag lines at the edges of the touch panel, but can further overcome the problem of linearity and accuracy offsets of the frame of the touch panel.

Figure 4:
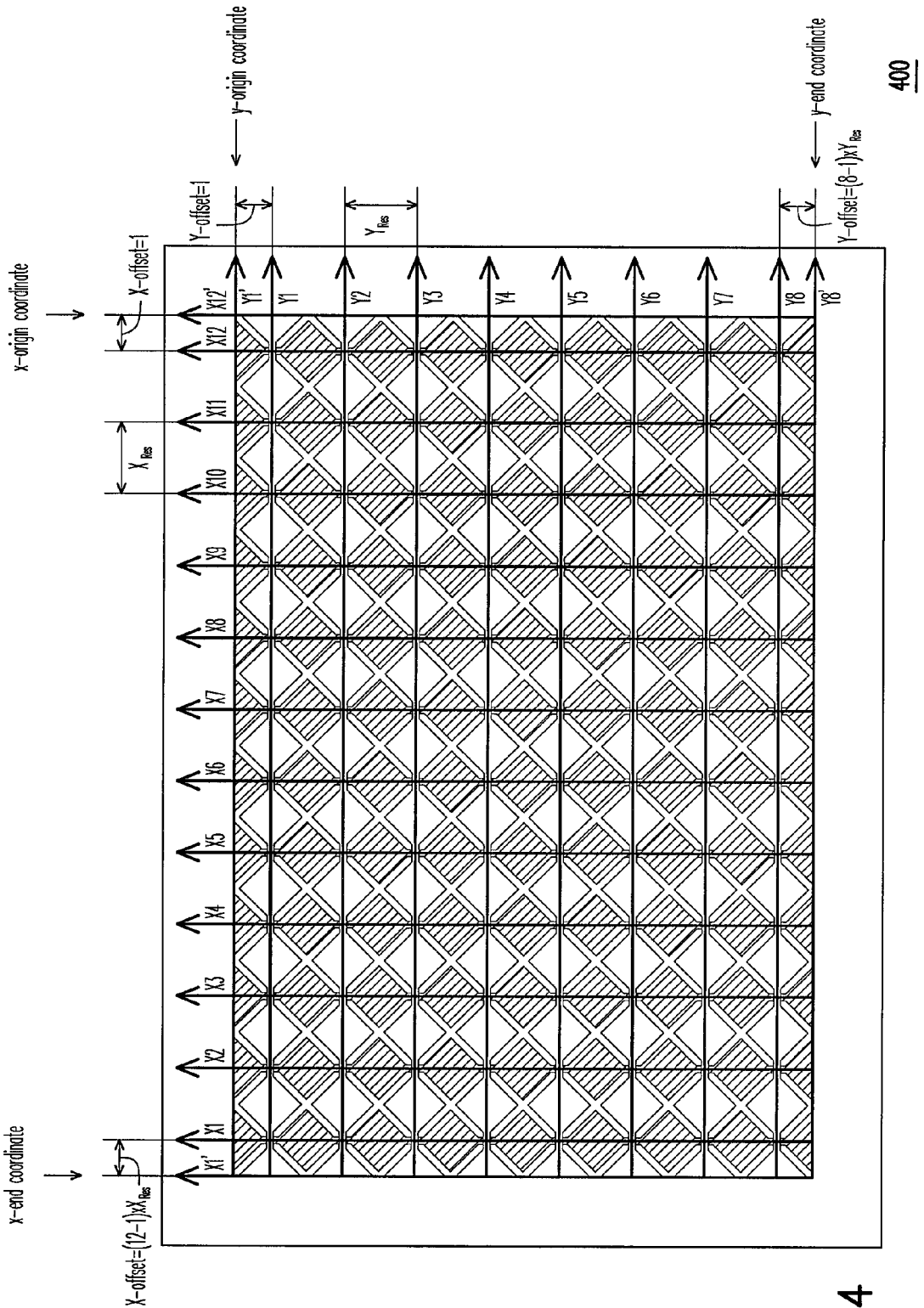
FIG. 4 is a schematic view of a touch panel according to another embodiment of the invention.

FIG. 4 is a schematic view of a touch panel according to another embodiment of the invention. Referring to FIG. 4, under a condition that edge sensing lines are allowed to be additionally added to the touch panel 400, the algorithm manner of the embodiment of FIG. 3 may be used; however, it should be noted that the manner of defining the coordinate compensation parameters X-offset and Y-offset of this embodiment is different from the embodiment of FIG. 3.

In detail, in this embodiment, one sensing line being Y1', Y12', X1', and X12' is respectively added to upper, lower, left, and right edges of the touch panel 400. Therefore, in this embodiment, coordinate compensation parameters of the upper, lower, left, and right edges of the touch panel 400 are, for example, defined to be Y-offset=1, Y-offset=(8−1)×$Y_{Res}$, X-offset=1, and X-offset=(12−1)×$X_{Res}$ respectively. In other words, in this embodiment, the coordinate compensation parameters X-offset and Y-offset are defined according to the number of the sensing lines of each direction.

Figure 5:
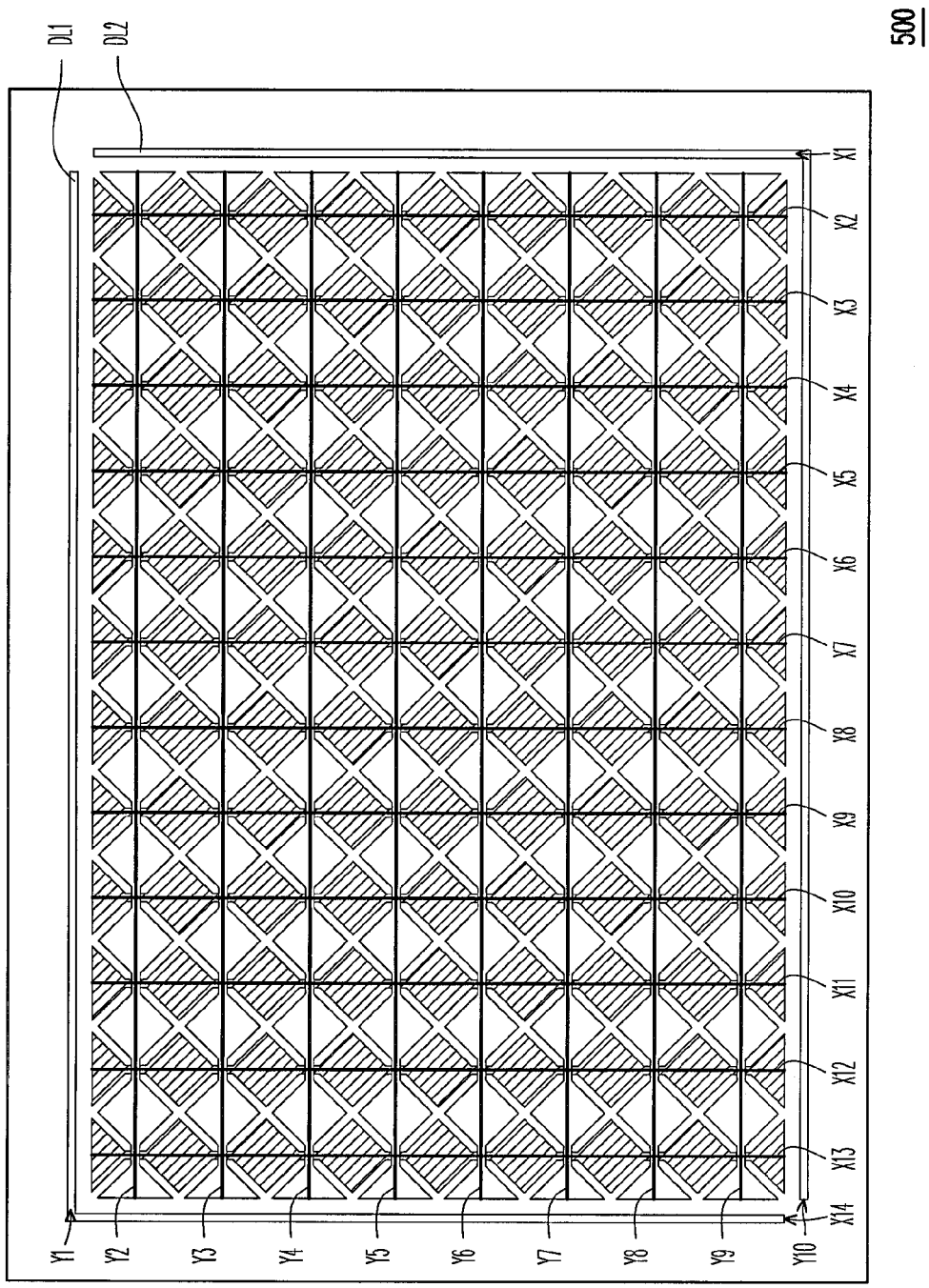
FIG. 5 is a schematic view of a touch panel according to another embodiment of the invention.

FIG. 5 is a schematic view of a touch panel according to another embodiment of the invention. Referring to FIG. 5, under a condition that edge sensing lines are allowed to be additionally added to the touch panel 500, and in an application where it is required to reduce edge regions of the touch panel 500, dummy lines DL1 and DL2 may be arranged on the edge regions of the touch panel 500. In FIG. 5, a mark Y1 points to a horizontal part of the dummy line DL1, and represents that the horizontal part is used as a y-direction sensing line, and a mark Y10 points to a horizontal part of the dummy line DL2, and represents that the horizontal part is used as a y-direction sensing line. A mark X1 points to a vertical part of the dummy line DL2, and represents that the vertical part is used as an x-direction sensing line, and a mark X14 points to a vertical part of the dummy line DL1, and represents that the vertical part is used as an x-direction sensing line.

Therefore, in this embodiment, in addition to using the algorithm manner of the embodiment of FIG. 4, different inductive capacitance values resulting from an area difference between the sensing line and the dummy line need to be adjusted according to an appropriate scaling ratio through an interpolation operation between the sensing line and the dummy line, so as to obtain a linear coordinate output of the edge region. In other words, in the coordinate algorithm according to this embodiment, according to the area difference between the touched sensing line of the specific direction and the corresponding dummy line, a corresponding interpolation coordinate is scaled, so as to obtain the linear coordinate output.

Figure 6:
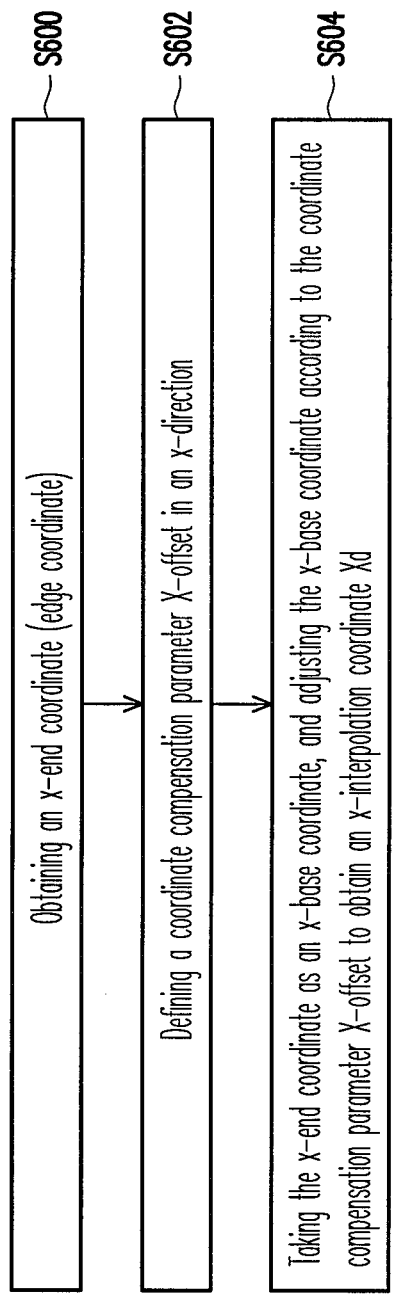
FIG. 6 is a process flowchart of a coordinate algorithm according to an embodiment of the invention.

FIG. 6 is a process flowchart of a coordinate algorithm according to an embodiment of the invention. Referring to FIG. 3 and FIG. 6, the coordinate algorithm according to this embodiment includes the following steps. For example, the left edge of the touch panel 200 is touched. Firstly, in Step S600, an x-end coordinate (edge coordinate) is obtained. Then, in Step S602, a coordinate compensation parameter X-offset in an x-direction is defined. Afterwards, when the edge of the touch panel 200 is touched, in Step S604, the x-end coordinate is taken as an x-base coordinate, and the x-base coordinate is adjusted according to the coordinate compensation parameter X-offset (for example, according to Formula (1)) to obtain an x interpolation coordinate Xd.

When a human body approaches the lower, upper, or right edge of the touch panel, the coordinate algorithm is performed according to the process flowchart of the coordinate algorithm of FIG. 6. By analogy, the corresponding interpolation coordinates are obtained, and the details will not be described herein again.

In addition, for the coordinate algorithm according to the embodiment of the invention, enough teachings, suggestions, and implementations may be obtained from the description of the embodiments from FIG. 2 to FIG. 5, so that the details will not be described herein again.

Based on the above, through the software algorithm and the hardware modification proposed in the exemplary embodiments of the invention, at least the problems of zigzag lines and linearity and accuracy offsets at the edges of the touch panel can be alleviated by adjustment with the coordinate compensation parameters.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A coordinate algorithm of a touch panel, wherein the touch panel comprises a plurality of first-direction sensing lines and a plurality of second-direction sensing lines, the coordinate algorithm comprising:
    obtaining a first edge coordinate and a second edge coordinate;
    defining a first coordinate compensation parameter and a second coordinate compensation parameter; and
    wherein the step of defining the first coordinate compensation parameter comprises defining the first coordinate compensation parameter according to the number of the first-direction sensing lines;
    wherein the step of defining the second coordinate compensation parameter comprises defining the second coordinate compensation parameter according to the number of the second-direction sensing lines;
    taking the first edge coordinate as a first base coordinate, and adjusting the first base coordinate according to the first coordinate compensation parameter to obtain a first interpolation coordinate when a first edge of the touch panel is touched; and
    taking the second edge coordinate as a second base coordinate, and adjusting the second base coordinate according to the second coordinate compensator parameter to obtain a second interpolation coordinate when the first edge or a second edge of the touch panel is touched,
    wherein the touch panel further comprises a first dummy line and a second dummy line, the first dummy line and the second dummy line are physical sensing lines and arranged on an edge region of the touch panel, the first dummy line and the second dummy line respectively comprise a first part and a second part, and the coordinate algorithm further comprises:
    scaling the first interpolation coordinate according to an area difference between the touched first-direction sensing line and the first part of the first dummy line or the first part of the second dummy line; and
    scaling the second interpolation coordinate according to an area difference between the touched second-direction sensing line and the second part of the first dummy line or the second part of the second dummy line.

2. The coordinate algorithm of a touch panel according to claim 1, wherein M stages of first-direction coordinates are differentiated between two of the neighboring first-direction sensing lines, and M is a positive integer.

3. The coordinate algorithm of a touch panel according to claim 2, wherein the step of defining the first coordinate compensation parameter comprises:
    defining the first coordinate compensation parameter according to the M value.

4. The coordinate algorithm of a touch panel according to claim 1, wherein N stages of second-direction coordinates are differentiated between two of the neighboring second-direction sensing lines, and N is a positive integer.

5. The coordinate algorithm of a touch panel according to claim 4, wherein the step of defining the second coordinate compensation parameter comprises:
    defining the second coordinate compensation parameter according to the N value.

6. The coordinate algorithm of a touch panel according to claim 1, wherein an arrangement direction of the first-direction sensing lines is substantially perpendicular to an arrangement direction of the second-direction sensing lines.

* * * * *